United States Patent [19]

Chen et al.

[11] Patent Number: 5,863,270
[45] Date of Patent: Jan. 26, 1999

[54] SELF-CONTAINED CHANGE SPEED APPARATUS FOR USE ON A BICYCLE

[75] Inventors: Caesar Chen; Jung-Ping Chiang, both of Taipei; Yu-Ming Huang, Kaohsiung; Ching-Huei Wu, Taipei, all of Taiwan

[73] Assignee: Industrial Technology Research Institute, Hsinchu, Taiwan

[21] Appl. No.: 929,806

[22] Filed: Sep. 15, 1997

[51] Int. Cl.⁶ .................................................. F16H 3/56
[52] U.S. Cl. ........................................ 475/289; 74/337.5
[58] Field of Search ............................ 475/289; 74/337.5

[56] References Cited

U.S. PATENT DOCUMENTS

| | | | |
|---|---|---|---|
| 4,721,013 | 1/1988 | Steuer, et al. | 475/289 |
| 4,973,297 | 11/1990 | Bergles | 475/289 |
| 5,273,500 | 12/1993 | Nagano | 475/312 |
| 5,322,487 | 6/1994 | Nagano | 475/297 |
| 5,443,279 | 8/1995 | Nurnberger | 475/289 |
| 5,562,563 | 10/1996 | Shoge | 475/289 |

*Primary Examiner*—Dirk Wright
*Attorney, Agent, or Firm*—W. Wayne Liauh

[57] ABSTRACT

A self-contained change speed apparatus for use on a bicycle. It has fixed shaft, a hub body rotatably supported on the fixed shaft, a change speed device controlled to turn the hub body about the fixed shaft at one of a series of speeds, and a power input member adapted to provide driving power, A clutch is moved between an active position and a non-active position and adapted to transmit driving power from the power input member to the change speed device. A control mechanism changes the speed ratio of the change speed device, advances the clutch to the non-active position before changing the speed of the change speed device, and delays the movement of the clutch to the active position, for permitting driving power to be returned to the change speed device after a change of the speed ratio of the change speed device.

9 Claims, 6 Drawing Sheets

SELF-CONTAINED CHANGE SPEED APPARATUS FOR USE ON A BICYCLE

BACKGROUND OF THE INVENTION

The present invention relates to a self-contained change speed apparatus for use on a bicycle which has a change speed device that can be conveniently controlled by the user to change the revolving speed of the wheel hub.

Self-contained change speed apparatus for use on a bicycle are known, for example, from U.S. Pat. Nos. 5,322, 487; 5,273,500. Conventional self-contained change speed apparatus for use on a bicycle commonly comprise a planetary gear train for producing different speed ratio, and a clutch for controlling the power transmission path. The power input links for the planetary gear train includes an annular gear and a carrier. According to the kinematic characteristic of a planetary train, the turning direction of the sun gear will be changed when a driving power is transmitted through a different power input link. Therefore, one sun gear must be matched with two reversed one-way pawls, i.e., one one-way pawl for forward rotation control and the other for backward rotation control. Further, when the rotary power from the pedal mechanism of the bicycle is continuously transmitted to the planetary gear train, much power must be employed to the control device for changing the speed. According to the power curve of the pedal mechanism, the input power produced from the pedal mechanism when the crank of the pedal mechanism is at the top or bottom dead point is smaller than the input power when the crank is at the other positions. Therefore less power is required for changing the speed when the crank of the pedal mechanism is at the top or bottom dead point. The aforesaid U.S. Pat. No. 5,322,487 utilizes this characteristic, and employs a spring set between the power input device and the control member for storing energy. The spring stores a shift of the control member as energy. When the crank of the pedal mechanism of the bicycle reaches the top or bottom dead point, the spring releases its stored energy to achieve a speed change. However, this design tends to cause a speed change behindhand.

SUMMARY OF THE INVENTION

The present invention has been accomplished to provide a self-contained change speed apparatus for use on a bicycle which eliminates the aforesaid problem. It is the main object of the present invention to provide a control mechanism for a self-contained change speed apparatus which advances the clutch to the non-active position before changing the speed of the change speed device of the self-contained change speed apparatus, and delays the movement of the clutch to the active position, for permitting the driving power to be returned to the change speed device after a change of the speed of the change speed device. The change speed device comprises a planetary gear train having two annular gears, one for power input and the other for power output. During the operation of the planetary gear of the planetary gear train, the sun gears of the planetary gear train are turned in the same direction, therefore only one set of one-way pawls is sufficient for controlling the one-way rotary motion of the sun gears. The invention simplifies the one-way pawl control mechanism, and makes the apparatus compact and lightweight.

DETAILED DESCRIPTION OF THE PREFERRED EMBODIMENT

Figure 1:
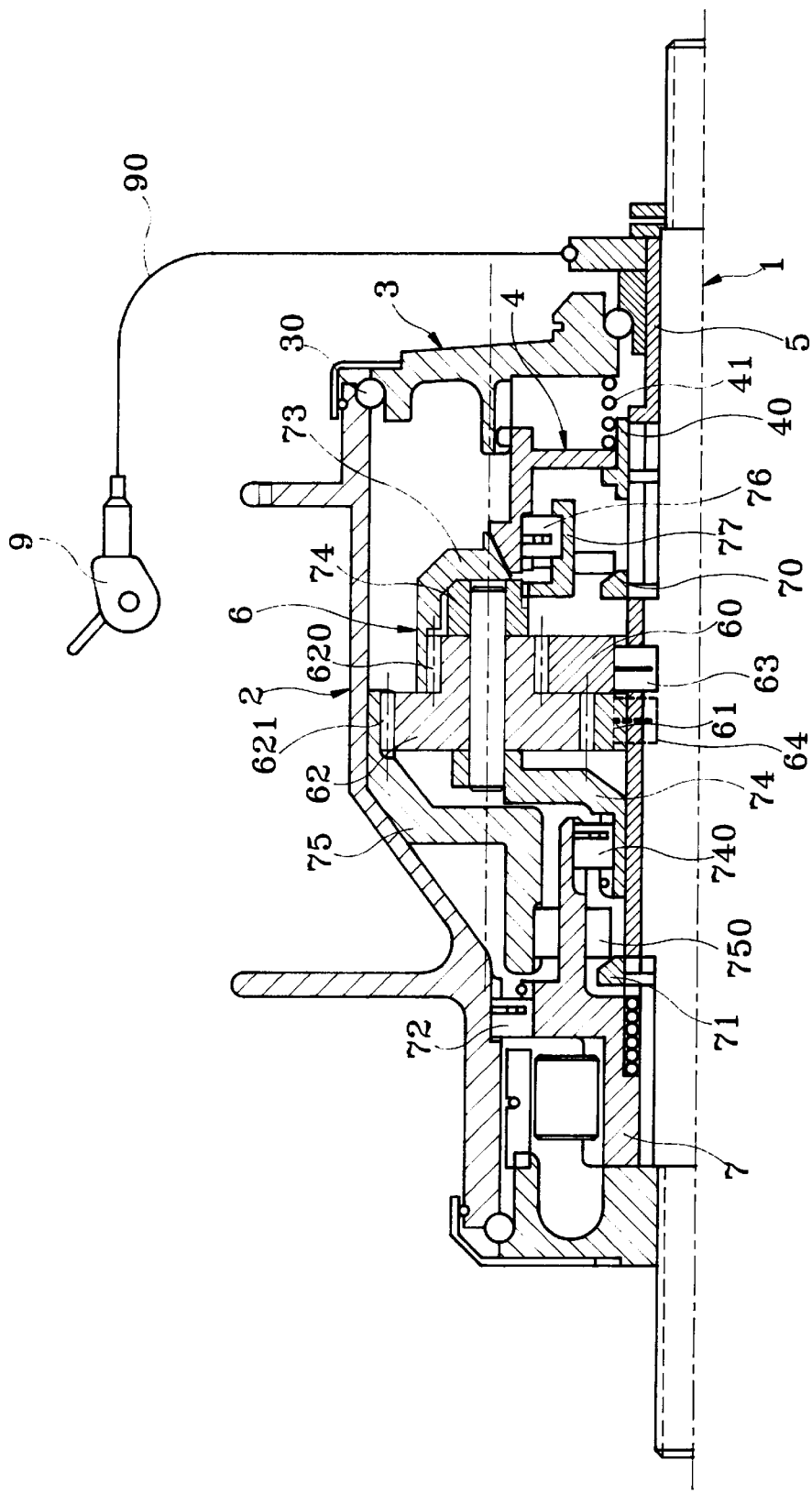
FIG. 1 is a sectional view of a self-contained change speed apparatus according to the present invention.
Figure 2:
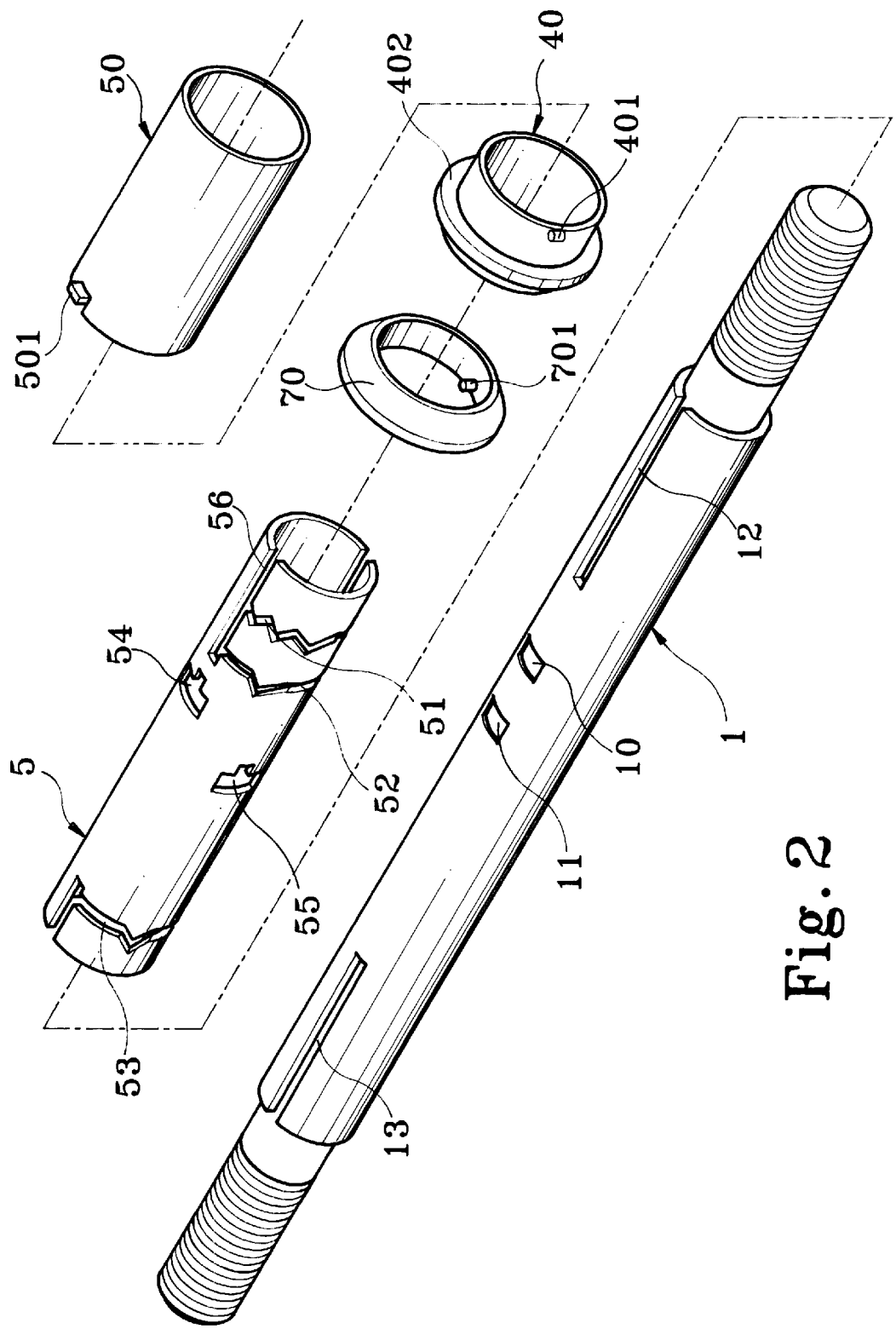
FIG. 2 is an exploded view of a part of the present invention, showing the structure of the control mechanism and the fixed shaft.

Referring to FIGS. 1 and 2, a self-contained change speed apparatus in accordance with the present invention is generally comprised of a fixed shaft 1 fixedly fastened to a frame of a bicycle, a hub body 2 rotatably supported on the fixed shaft 1, a change speed device controlled to turn the hub body 2 about the fixed shaft 1 at one of a series of speeds, a power input member 3 coupled to a pedal mechanism through a transmission device (for example a chain) to receive a driving power from the cyclist, a clutch 4 adapted to transmit the driving power from the power input member 3 to the change speed device and being moved between the active position in which the driving power is transmitted from the power input member 3 to the change speed device, and the non-active position in which the driving power is disconnected from the change speed device, and a control mechanism adapted for changing the gear shift level (speed) of the change speed device, advancing the clutch 4 to the non-active position before changing the gear shift level of the change speed device, and delaying the movement of the clutch 4 to the active position, for permitting the driving power to be returned to the change speed device again after a change of the gear shift level (speed) of the change speed device, so as to diminish the operating power required for the switching of the gear shift level of the change speed device.

The aforesaid control mechanism comprises a control barrel 5 rotatably supported on the fixed shaft 1, and a rotary member 50 linked to the control barrel 5. The control barrel 5 is controlled by a gear shift controller 9 through a control wire C, to change the power transmission path of the change speed mechanism and to simultaneously move the clutch 4 between the active position and the non-active position. The control barrel 5 comprises cam means to change a rotary motion to a linear motion. The cam means comprises a first cam unit 51 adapted to move a clutch socket 40, a second cam unit 52 adapted to move a first sliding member 70, a third cam unit 53 adapted to move a second sliding member 71, a first control hole 54 adapted to control a first one-way pawl 63, a second control hole 55 adapted to control a second one-way pawl 64, and a longitudinal slot 56 extended from one end. The first cam unit 51, second cam unit 52 and third cam unit 53 are grooved tracks circumferentially disposed on the control barrel 5. Each of the grooved tracks includes a plurality of points connected together and respectively disposed at different axial locations, which determine the displacement of the clutch (4) between the active position and the non-active position.

Figure 3:
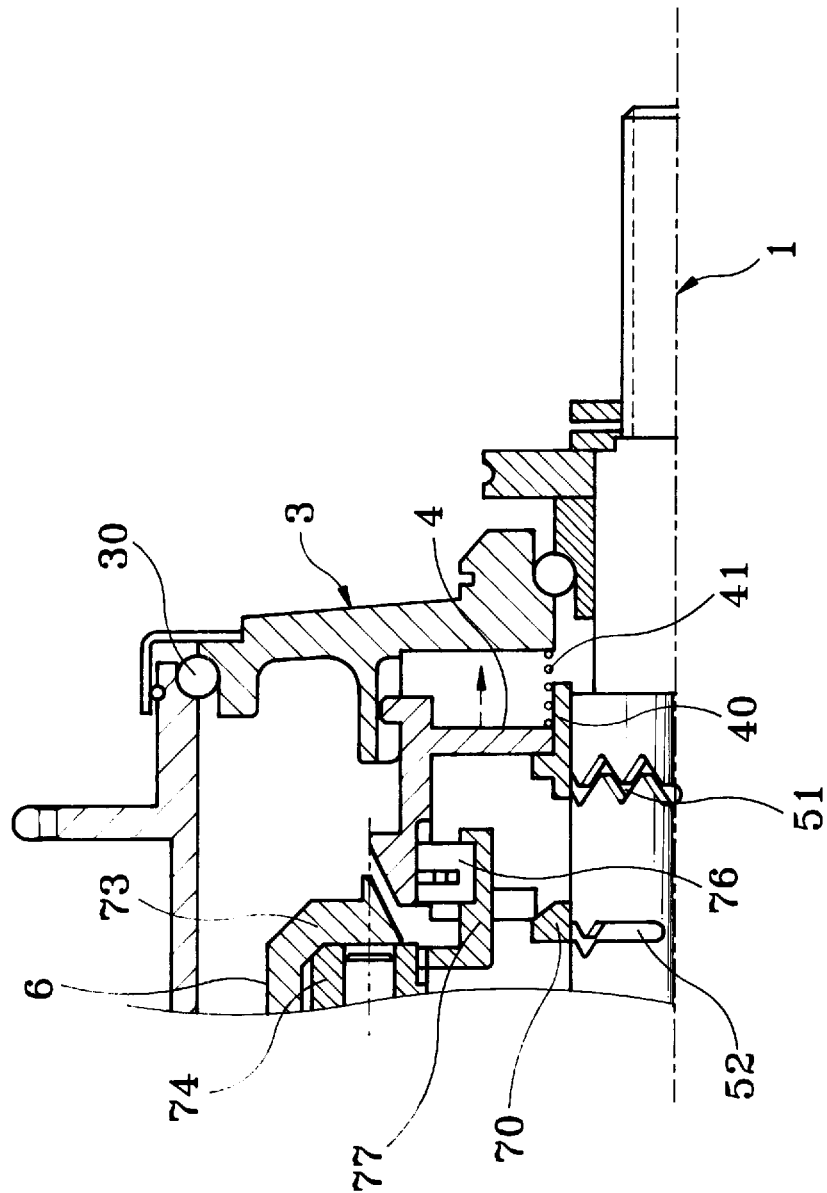
FIG. 3 is an enlarged view of a part of FIG. 1, showing the clutch disengaged from the change speed mechanism.

The rotary member 50 has a stub coupling rod 501 raised from its one end and forced into the longitudinal slot 56 of the control barrel 5 for permitting the control barrel 5 to be synchronously turned with the rotary member 50. The clutch socket 40 and the first sliding member 70 have a respective inside pin 401;701 adapted to move in a longitudinal slot namely the first longitudinal slot 12 of the fixed shaft 1. The second sliding member 71 has an inside pin 711 adapted to move in a longitudinal slot namely the second longitudinal slot 13 of the fixed shaft 1. The first longitudinal slot 12 and the second longitudinal slot 13 are respectively and longitudinally extended from two opposite ends of the fixed shaft 1 to a predetermined distance. When the control barrel 5 is turned about the fixed shaft 1, the clutch socket 40, the first sliding member 70 and the second sliding member 71 are respectively forced by the first cam unit 51, the second cam unit 52 and the third cam unit 53 to move axially along the fixed shaft 1. The clutch socket 40 further comprises a collar 402 around the periphery. A return spring 41 is supported between the power input member 3 and the clutch 4 The return spring 41 imparts an axial pressure to the clutch 4, causing it to be closely attached to the collar 402 of the clutch socket 40. Therefore, when the clutch socket 40 is driven to make a linear motion, the clutch 4 is moved between the active position and the non-active position (see also FIG. 3).

The aforesaid fixed shaft 1 is fixedly fastened to the frame of the bicycle, having a first recessed portion 10 and a second recessed portion 11. The power input member 3 is rotatably supported on the fixed shaft 1 and coupled to the hub body 2 by a bearing 30. Therefore the power input member 3 and the hub body 2 can be separately rotated relative to each other.

The aforesaid change speed device comprises a planetary gear train 6, a power output shaft 7 adapted to transmit the rotary power of the planetary gear train 6 to the hub body 2 through a pawl 72, an annular input gear 73 coupled between the planetary gear train 6 and the clutch 4, a carrier 74 adapted to support the planetary gear train 6, and an annular output gear 75 coupled between the planetary gear train 6 and the power output shaft 7. The carrier 74 has a pawl 740 at one end coupled to the power output shaft 7. The annular output gear 75 has a pawl 750 coupled to the power output shaft 7. The planetary gear train 6 comprises a first sun gear 60 and a second sun gear 61, a planetary gear 62 having a first ratchet 620 meshed with the first sun gear 60 and a second ratchet 621 meshed with the second sun gear 61, a first one-way pawl 63 mounted in the first recessed portion 10 of the fixed shaft 1, and a second one-way pawl 64 mounted in the second recessed portion 11 of the fixed shaft 1.

Figure 7:
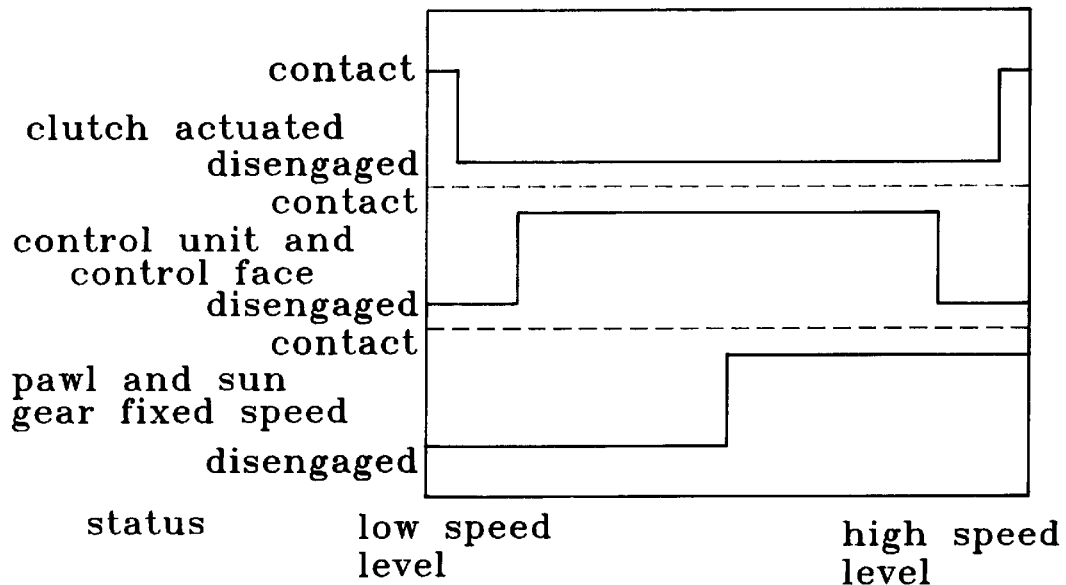
FIG. 7 explains the operation procedure of the clutch at an up-shifting stage.

FIG. 7 shows the operation of the clutch 4 when shifting up. As illustrated there is a time difference between the time in which the first one-way pawl 63 or second one-way pawl 64 is moved by the first control hole 54 or second control hole 55 and the time in which the clutch 4 is coupled to the change speed mechanism. By means of the control of the first cam unit 51, a lead time is provided before shifting up, enabling the clutch 4 to be disengaged from the change speed mechanism. After the clutch 4 is disengaged from the change speed mechanism, the first control hole 54 or second control hole 55 is driven to move the first one-way pawl 63 or second one-way pawl 64. The first one-way pawl 63 or second one-way pawl 64 is forced inwardly away from the first sun gear 60 or second sun gear 61 by the inside wall of the control barrel 5, enabling the first sun gear 60 or second sun gear 61 to be freely rotated. When the change speed mechanism is shifted to the selected gear shift level, a time delay is provided, and then the clutch 4 is returned into engagement with the change speed mechanism to transmit the driving power to the change speed mechanism.

Figure 8:
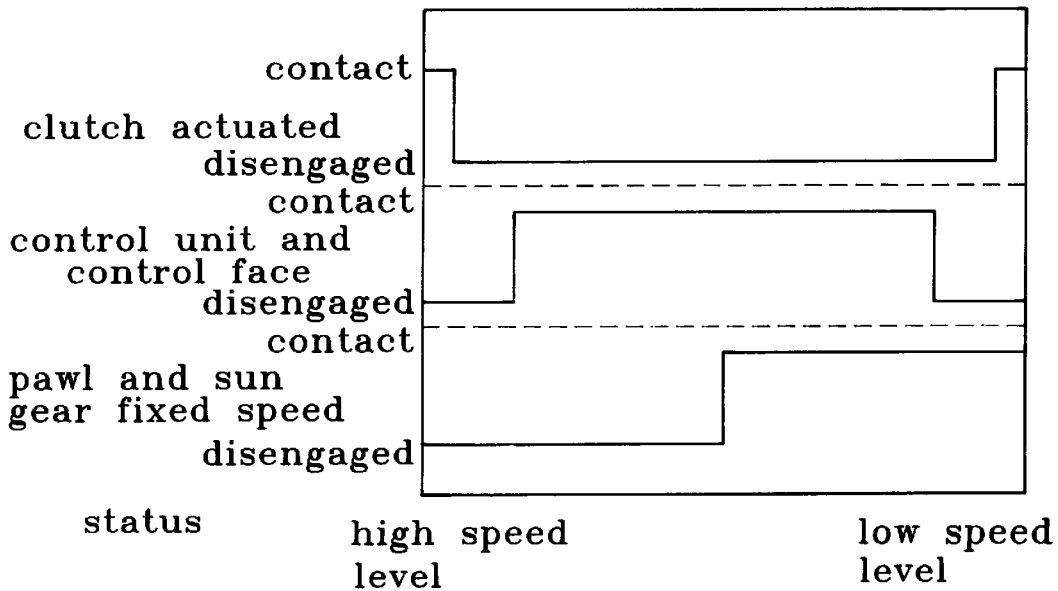
FIG. 8 explains the operation procedure of the clutch at a down-shifting stage.

FIG. 8 shows the operation of the clutch 4 when shifting down. By means of the control of the first cam unit 51, a lead time is provided before shifting down, enabling the clutch 4 to be disengaged from the change speed mechanism. After the clutch 4 is disengaged from the change speed mechanism, the first control hole 54 or second control hole 55 is driven to move the first one-way pawl 63 or second one-way pawl 64. The first one-way pawl 63 or second one-way pawl 64 is forced inwardly away from the first sun gear 60 or second sun gear 61 by the inside wall of the control barrel 5, enabling the first sun gear 60 or second sun gear 61 to be freely rotated. When the change speed mechanism is shifted to the selected gear shift level, a time delay is provided, and then the clutch 4 is returned into engagement with the change speed mechanism to transmit the driving power to the change speed mechanism.

Figure 4:
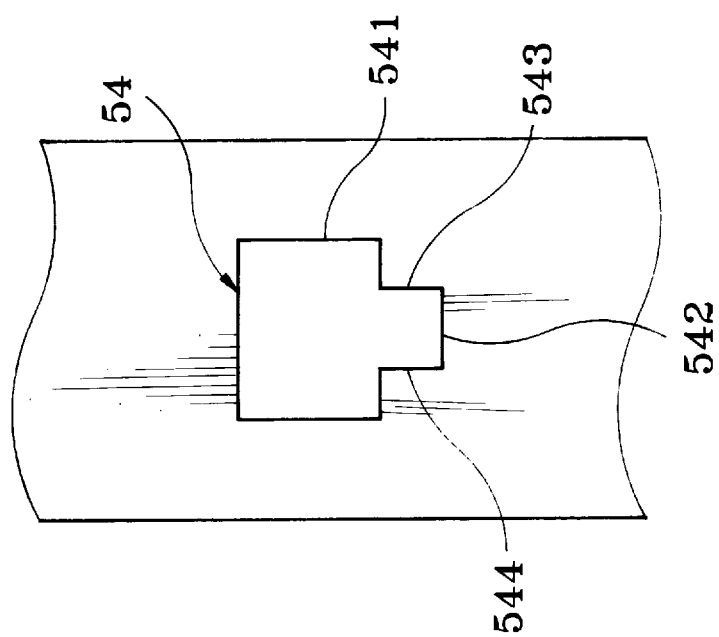
FIG. 4 is an enlarged view of a part of the control barrel shown in FIG. 2, showing the configuration of the control hole.
Figure 5:
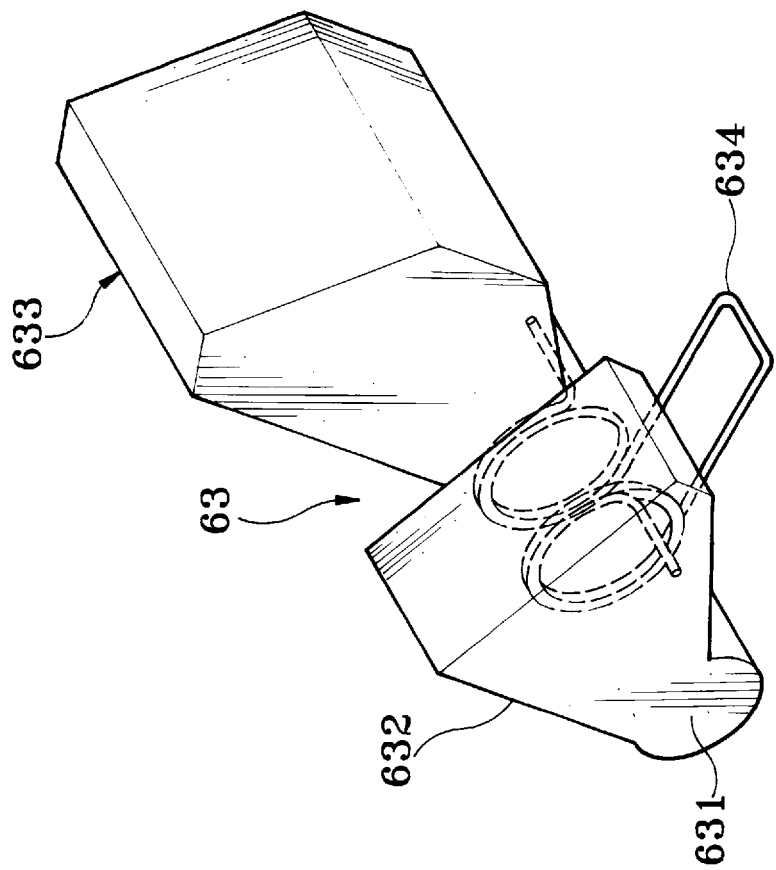
FIG. 5 is a perspective view of an one-way pawl according to the present invention.
Figure 6A:
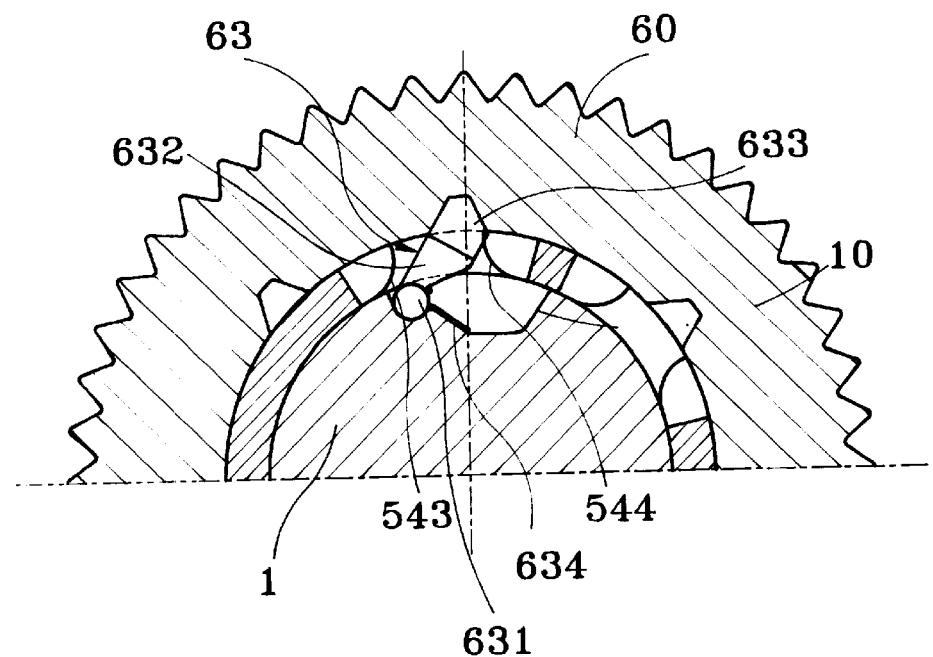
FIG. 6A is a sectional view of a part of the control mechanism according to the present invention, showing the one-way pawl meshed with the sun gear.
Figure 6B:
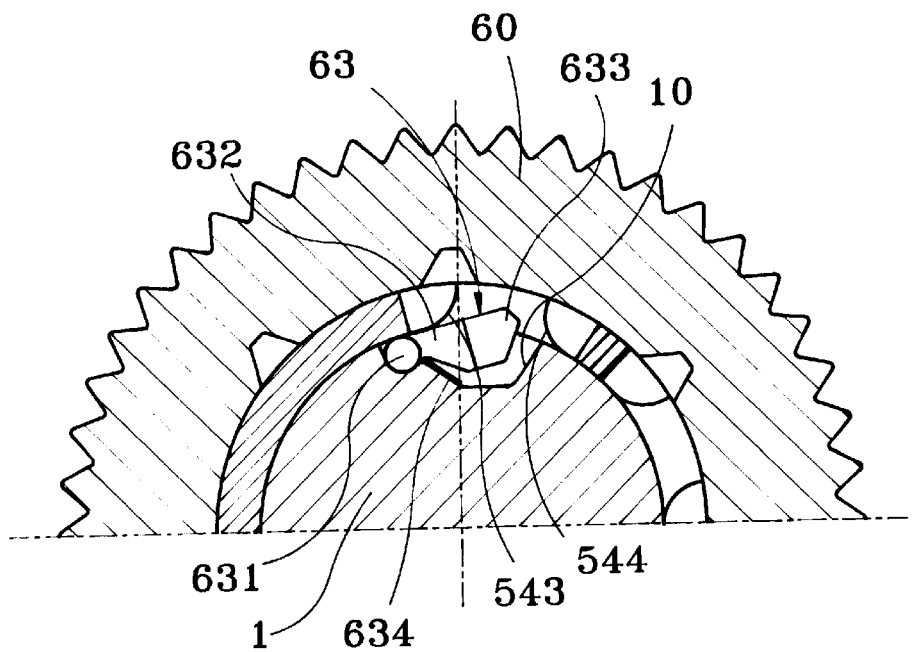
FIG. 6B is similar to FIG. 6A but showing the one-way pawl disengaged from the sun gear.

The first control hole 54 and the second control hole 55 are identical in shape. The first one-way pawl 63 and the second one-way pawl 64 are identical in structure. The arrangement of the first control hole 54 and the first one-way pawl 63 and the relationship therebetween are explained hereinafter with reference to FIGS. 4 and 5 (The arrangement of the second control hole 55 and the second one-way pawl 64 and their relationship are similar to that of the first control hole 54 and the first one-way pawl 63). The first one-way pawl 63 comprises a revolving shaft 631, a control element 632 and a lock tooth 633 connected in parallel to the revolving shaft 631, and a torsional spring 634. The revolving shaft 631 is revolvably mounted in the first recessed portion 10 of the fixed shaft 1. The torsional spring 634 imparts a pressure to the revolving shaft 631, causing the tooth 633 to be forced into engagement with the first sun gear 60 (see FIG. 6A) to limit its turning direction. The first control hole 54 comprises a first opening 541 through which the lock tooth 633 protrudes, a second opening 542 through which the control element 632 protrudes, and two control planes 543;544 at two opposite lateral sides of the second opening 542. The pitch between the control planes 543;544 is narrower than the distance between two opposite lateral sides of the first opening 541. Before the first one-way pawl 63 or second one-way pawl 64 is constrained by the first control hole 54 or second control hole 55 (see FIG. 6B), the clutch 4 stops the transmission of the driving power to the change speed mechanism, therefore less power is required for turning the control barrel 5 at this stage.

The gear shift levels (speeds) and the related power transmission paths of the change speed hub body of the bicycle are outlined hereinafter.

When at the highest gear shift level (the highest speed), the driving power is transmitted by the power input member 3 to the annular input gear 73 through the clutch 4. At this stage, the first one-way pawl 63 is meshed with the first sun gear 60, causing the first sun gear 60 to be retained to the fixed shaft 1 in a locked position. After through the speed ratio between the planetary gear train 6 and the first sun gear 60, the driving power is transmitted to the carrier 74, then to the power output shaft 7 through the pawl 740, and then to the hub body 2 through the pawl 72.

When at the first high gear shift level (the second highest speed), the driving power is transmitted by the power input member 3 to the clutch 4, then to the annular input gear 73. At this stage, the second one-way pawl 64 is meshed with the second sun gear 61, causing the second sun gear 61 to be retained to the fixed shaft 1 in a locked position. After through the speed ratio between the planetary gear train 6 and the second sun gear 61, the driving power is transmitted to the carrier 74, then to the power output shaft 7 through the pawl 740, and then to the hub body 2 through the pawl 72.

When at the middle gear shift level (the middle speed), the driving power is transmitted by the power input member 3 to the clutch 4, the first sliding member 70 forces a pawl 76 into engagement with a ratchet inside the clutch 4, for permitting the driving power to be transmitted from the clutch 4 to the change speed mechanism via a transmission element 77. At this stage, the first one-way pawl 63 and the second one-way pawl 64 are forced by the control barrel 5 to disengage from the first sun gear 60 and the second sun gear 61 respectively, enabling the first sun gear 60 and the second sun gear 61 to be freely rotated. Therefore the driving power is directly transmitted through the pawl 740 of the carrier 74 to the power output shaft 7 without through the reduction of the planetary gear train 6, and then transmitted from the power output shaft 7 to the hub body 2 by the pawl 72.

When at the second lowest gear shift level (the second lowest speed), the driving power is transmitted by the power input member 3 to the clutch 4, then to the annular input gear 73. At this stage, the second one-way pawl 64 is meshed with the second sun gear 61, causing the second sun gear 61 to be retained to the fixed shaft 1 in a locked position. After through the speed ratio between the planetary gear train 6 and the second sun gear 61, the driving power is transmitted to the annular output gear 75, then to the power output shaft 7 through the pawl 740, and then to the hub body 2 through the pawl 72.

When at the lowest gear shift level (the lowest speed), the driving power is transmitted by the power input member 3 to the clutch 4, then to the annular input gear 73. At this stage, the first one-way pawl 63 is meshed with the first sun gear 60, causing the first sun gear 60 to be retained to the fixed shaft 1 in a locked position. After through the speed ration between the planetary gear train 6 and the second sun gear 61, the driving power is transmitted to the annular output gear 75, then to the power output shaft 7 through the pawl 740, and then to the hub body 2 through the pawl 72.

While only one embodiment of the present invention has been shown and described, it will be understood that various modifications and changes could be made thereunto without departing from the spirit and scope of the invention disclosed.

We claim:

1. A self-contained change speed apparatus of a bicycle, comprising:

a fixed shaft fixedly mounted on a frame of the bicycle;

a hub body rotatably supported on said fixed shaft;

a change speed device controlled to turn said hub body about said fixed shaft at one of a series of speeds;

a power input member adapted to provide a driving power;

a clutch adapted to transmit said driving power from said power input member to said change speed device, said clutch being moved between the active position in which said driving power is transmitted from said power input member to said change speed device, and the non-active position in which said driving power is disconnected from said change speed device; and a control mechanism adapted for changing the speed of said change speed device, advancing said clutch to the non-active position before changing the speed of said change speed device, and delaying the movement of said clutch to the active position, for permitting said driving power to be returned to said change speed device after a change of the speed of said change speed device.

2. The self-contained change speed apparatus of claim 1, wherein said clutch is moved axially along said fixed shaft between the active position and the non-active position.

3. The self-contained change speed apparatus of claim 1, wherein said control mechanism is adapted to change a rotary motion to a linear motion for moving said clutch between the active position and the non-active position.

4. The self-contained change speed apparatus of claim 3, wherein said control mechanism comprises a control barrel rotatably supported on said fixed shaft and having cam means, and a clutch socket driven by said cam means to move said clutch between the active position and the non-active position, said cam means comprising at least one grooved track circumferentially disposed on said control barrel.

5. The self-contained change speed apparatus of claim 4, wherein each of said at least one grooved track includes a plurality of points connected together and respectively disposed at different axial locations, said different axial locations determining the displacement of said clutch between the active position and the non-active position.

6. The self-contained change speed apparatus of claim 1, wherein said change speed mechanism comprises a planetary gear train, a power output shaft adapted to transmit the rotary power of said planetary gear train to said hub body, an annular input gear coupled between said planetary gear train and said clutch, a carrier adapted to support said planetary gear train, and an annular output gear coupled between said planetary gear train and said power output shaft.

7. The self-contained change speed apparatus of claim 6, wherein said planetary gear train comprises at least one sun gear rotatably supported on said fixed shaft; said control mechanism comprises at least one one-way pawl mounted in said fixed shaft and selectively controlled to mesh with or disengage from the at least one sun gear of said planetary gear train.

8. The self-contained change speed apparatus of claim 7, wherein said control mechanism comprises a control barrel having at least one control hole adapted to move said at least one one-way pawl of said control mechanism, causing said at least one one-way pawl to engage with or disengage from said at least one sun gear.

9. The self-contained change speed apparatus of claim 8, wherein each of said at least one one-way pawl comprises a revolving shaft, a control element and a lock tooth connected in parallel to said revolving shaft, and a torsional spring adapted to force said lock tooth into engagement with said at least one sun gear; each of said at least one control hole comprises a first opening through which said lock tooth protrudes, a second opening through which said control unit protrudes, and two control planes at two opposite lateral sides of said second opening for moving said control element, causing said lock tooth to disengage from said at least one sun gear.

* * * * *